United States Patent
Tran et al.

(10) Patent No.: US 7,313,589 B2
(45) Date of Patent: Dec. 25, 2007

(54) NETWORK PROJECTOR INTERFACE SYSTEM

(75) Inventors: De Tran, Portland, OR (US); Kevin D. Thompson, Salem, OR (US); Steve Murtha, Portland, OR (US)

(73) Assignee: InFocus Corporation, Wilsonville, OR (US)

( * ) Notice: Subject to any disclaimer, the term of this patent is extended or adjusted under 35 U.S.C. 154(b) by 716 days.

(21) Appl. No.: 10/260,124

(22) Filed: Sep. 27, 2002

(65) Prior Publication Data

US 2003/0115263 A1 Jun. 19, 2003

Related U.S. Application Data

(60) Provisional application No. 60/325,849, filed on Sep. 28, 2001.

(51) Int. Cl.
  *G06F 15/16* (2006.01)
  *G06F 3/00* (2006.01)
  *G06T 11/20* (2006.01)
(52) U.S. Cl. ............... 709/203; 345/440; 715/744
(58) Field of Classification Search ............ 709/203; 345/440; 715/744
  See application file for complete search history.

(56) References Cited

U.S. PATENT DOCUMENTS

| | | | |
|---|---|---|---|
| 5,745,711 A | | 4/1998 | Kitahara et al. |
| 5,767,897 A | * | 6/1998 | Howell .................... 348/14.07 |
| 5,859,623 A | * | 1/1999 | Meyn et al. ................. 715/730 |
| 5,924,013 A | | 7/1999 | Guido et al. |
| 6,005,534 A | * | 12/1999 | Hylin et al. ................. 345/2.1 |
| 6,046,750 A | * | 4/2000 | Fitzpatrick et al. ......... 345/440 |
| 6,091,409 A | | 7/2000 | Dickman et al. |
| 6,108,687 A | | 8/2000 | Craig |
| 6,388,654 B1 | | 5/2002 | Platzker et al. |
| 6,400,462 B1 | | 6/2002 | Hille |
| 6,437,786 B1 | * | 8/2002 | Yasukawa .................... 345/474 |
| 6,564,005 B1 | * | 5/2003 | Berstis ......................... 386/83 |
| 6,571,285 B1 | * | 5/2003 | Groath et al. ............... 709/223 |

(Continued)

FOREIGN PATENT DOCUMENTS

JP    2000 023148    1/2000

OTHER PUBLICATIONS

Pettelkau, Jeff. Toshiba TDP-SW20 Wireless DLP Projector. Oct. 2004 [retrieved on Mar. 15, 2007]. Retrieved from the Internet: <URL: http://www.jiwire.com/toshiba-TDP-SW20-wireless-projector-photo-image-gallery.htm>.

*Primary Examiner*—William Vaughn
*Assistant Examiner*—Ranodhi Serrao
(74) *Attorney, Agent, or Firm*—Alleman Hall McCoy Russell & Tuttle LLP

(57) ABSTRACT

A network projector interface system is provided. In one embodiment, the system includes client software stored on a recordable medium and at least partially executable on a client computer on a network, where the client software provides a client interface configured to aid a user in directing a presentation file to a selected network projector. The system also includes presentation manager software stored on a recordable medium executable on the network, where the presentation manager software produces a presentation manager configured to manage storage and access to the presentation file, and a network projector coupled to a projector computer, where the projector computer is coupled to the network and communicates with the presentation manager to display the presentation file on the selected network projector.

7 Claims, 4 Drawing Sheets

U.S. PATENT DOCUMENTS

| | | |
|---|---|---|
| 6,760,045 B1 * | 7/2004 | Quinn et al. ................. 715/744 |
| 6,807,558 B1 * | 10/2004 | Hassett et al. .............. 709/203 |
| 6,860,609 B2 | 3/2005 | Olson et al. |
| 2001/0033404 A1 | 10/2001 | Escobosa et al. |
| 2002/0012433 A1 | 1/2002 | Haverinen et al. |
| 2002/0049788 A1 * | 4/2002 | Lipkin et al. ................ 707/513 |
| 2002/0174085 A1 * | 11/2002 | Nelson et al. ................. 707/1 |
| 2002/0175915 A1 * | 11/2002 | Lichtfuss .................... 345/440 |
| 2003/0017846 A1 | 1/2003 | Estevez et al. |

* cited by examiner

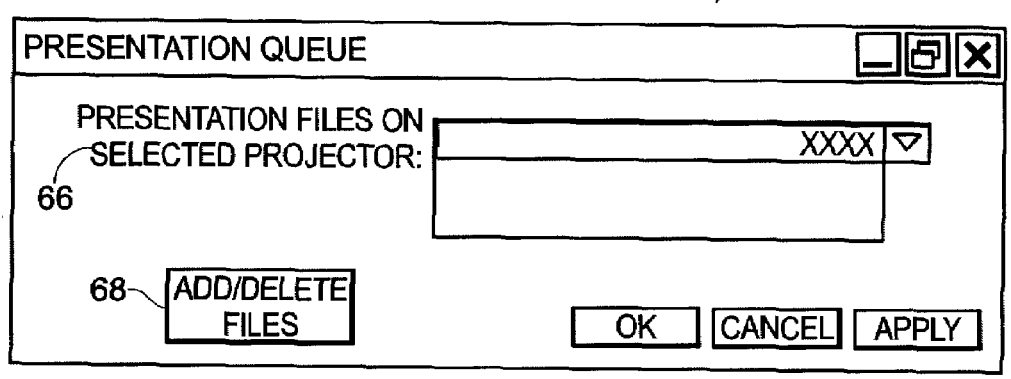
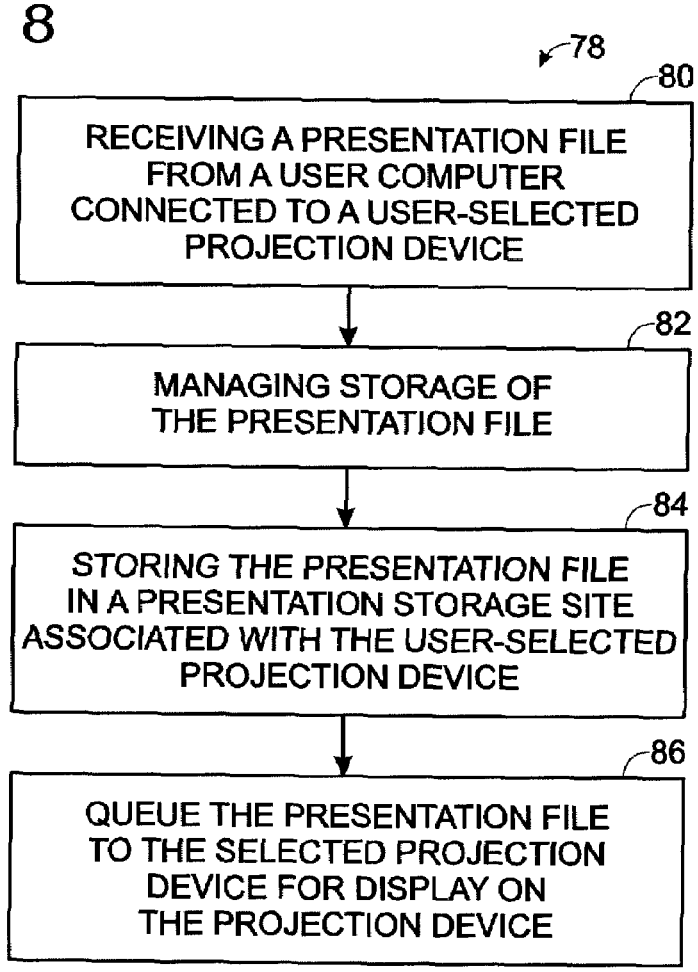

NETWORK PROJECTOR INTERFACE SYSTEM

CROSS REFERENCE TO RELATED APPLICATIONS

This application claims priority from U.S. Provisional Patent Application Ser. No. 60/325,849 of De Tran, Kevin Thompson and Steve Murtha, for a SYSTEM AND METHOD FOR PROVIDING A NETWORK PROJECTOR INTERFACE SYSTEM, filed Sep. 28, 2001, the disclosure of which is hereby incorporated by reference.

TECHNICAL FIELD

The present invention relates generally to projectors and more particularly, to a network projector interface system.

BACKGROUND OF THE INVENTION

In recent years, projectors, such as digital projectors, have found increased popularity as a tool for the presentation of content to an audience. The projectors are typically used to project a computer-generated presentation onto a viewing surface, and allow a user to easily present high-quality, professional appearing images to audiences of a range of sizes. As a result, such projectors are now often found as permanent fixtures in conference rooms and other meeting facilities.

A presentation may be provided to a projector for display in any one of a number of ways. Typically, a user connects a portable computer, on which the presentation may be stored, directly to the projector. Alternatively, a meeting room may be provided with a dedicated computer linked to the projector that a user may use to access their presentation. In some embodiments, the dedicated computer may be linked to a network such that a user is able to access presentations stored on the network.

The advantages offered by such a network-linked projector system may not by fully realized if the user interface is difficult for a user to learn or use. For example, a poorly designed or difficult-to-use interface may cause the user to have difficulty in storing, locating, altering and accessing presentation files. Therefore, there remains a need for a network projector user interface system that provides a user with a simple interface that allows the easy manipulation and access of presentation files.

SUMMARY OF THE INVENTION

Briefly, one aspect of the invention includes a network projector interface system. The network projector interface system typically includes client software stored on a recordable medium and at least partially executable on a client computer on a network. The client software provides a client interface configured to aid a user in directing a presentation file to a selected network projector. The system further includes presentation manager software that may be stored on a recordable medium executable on the network. The presentation manager software typically provides a presentation manager configured to manage storage and access to the presentation file. The system also includes a network projector coupled to a projector computer, where the projector computer is coupled to the network and communicates with the presentation manager to display the presentation file on the selected network projector.

In one embodiment of the invention, a system for managing a computer network including at least one network-enabled projector is provided. The system includes a user client computer linked to the network configured to enable a user to direct a presentation file to a user-selected projector, a presentation storage site linked to the network configured to store the presentation file for display on the user-selected projector, and a presentation manager linked to the network and accessible directly via the projector computer of the user-selected projector, wherein the presentation manager is configured to manage access to the presentation file stored in the presentation storage site.

Another aspect of the invention provides a method for managing a networked computer system including a user computer and projector device. The method includes receiving a presentation file from the user computer directed to a user-selected projector device on a network. The method further includes managing the storage of the presentation file on a presentation storage site on the network, where the presentation storage site is associated with the user-selected projector device, and queuing the presentation file to the selected projector device for display on the projector device.

Another aspect of the invention is directed towards a storage device readable by a machine. The storage device tangibly embodies a program of instructions executable by the machine to perform a method for use in accessing a presentation file from a network device. The method includes providing a user interface on the network that is configured to enable a user to request a presentation file be directed to a selected network projector, and directing the presentation file to a presentation storage site on the network managed by a presentation manager. The presentation manager manages access to the presentation file, and provides immediate access to the presentation file at the selected projector.

BRIEF DESCRIPTION OF THE DRAWINGS

FIG. 6 is a view of an exemplary presentation queue sub-screen of the embodiment of FIG. 4.

FIG. 8 is a flow diagram of a method for managing display of a presentation file on a networked computer system, the computer system including a user computer and a projector device.

DETAILED DESCRIPTION OF THE PREFERRED EMBODIMENTS

The following description discloses a network projector interface system that may be used in conjunction with any suitable network projector operating environment or network projector system. The network projector interface system facilitates user and administrator use of projectors in a network projector system. Although the following network projector interface system is described in a WINDOWS operating system environment, available from the Microsoft Corporation of Redmond, Wash., it will be appreciated that any other desired type of operating system may be used including, but not limited to, any of the APPLE/MACINTOSH operating systems, available from Apple Computer, Inc. of Cupertino, Calif., UNIX systems, Linux systems, etc.

Figure 1:
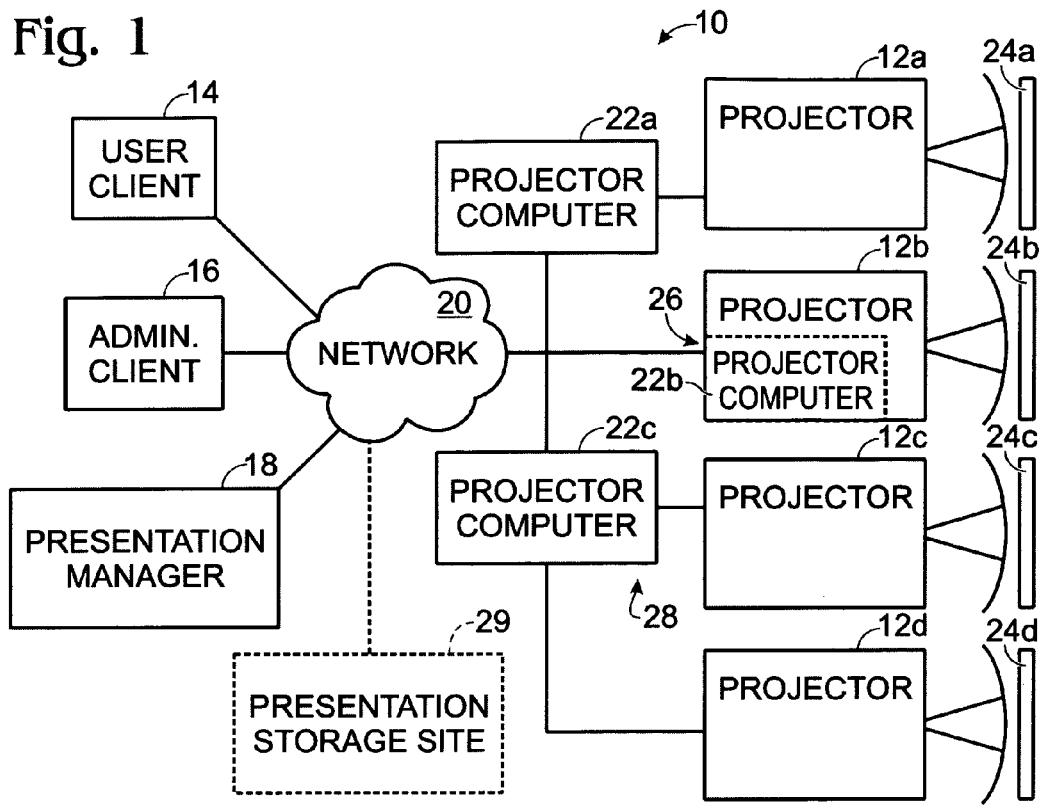
FIG. 1 is schematic representation of a network projector operating environment in which the present invention may be implemented.

Referring first to FIG. 1, a network projector operating environment or network projector system is shown generally at 10. Network projector operating environment 10 typically includes at least one projector 12 (e.g. 12a, 12b, 12c, 12d) linked via a network 20 to a user client 14, an administrator client 16 and a presentation manager 18. It will be understood that network projector system 10 is only an example of a suitable network projector operating environment, and that the network projector interface system, disclosed herein, may be used in any other suitable network projector operating environments, such as those disclosed in U.S. patent applications Ser. Nos. 09/590,034, entitled "Method and Apparatus for Remote Projector Administration and Control," and 09/877,909, entitled "Method and Apparatus for Wireless Image Transmission to a Projector" which are incorporated herein by reference.

As discussed in more detail below, the network projector interface system may include any number of individual components, including, but not limited to, a network interface board, firmware, an embedded Internet browser, administration software and/or user interface software. The network projector interface system may be provided as a factory-installed feature on one or more of the following: user client 14, administrator client 16, projector computer 22 (e.g. 22a, 22b, 22c) and/or presentation manager 18. Alternatively, the individual components may be installable by the end-user. Furthermore, the network projector interface system may include familiar computer navigation tools to aid a user in operating within the network projector operating environment 10, regardless of the types of projectors linked to the network.

Network projector operating environment 10 may include a single projector, or multiple projectors 12, as shown in FIG. 1. Projectors 12 may be any suitable type of data video projectors that are capable of projecting images onto a display surface 24 (e.g. 24a, 24b, 24c, 24d). For example, projectors 12 may utilize any desired type of image production systems, including, but not limited to, liquid crystal displays (LCDs), digital mirror devices (DMDs), liquid crystal on silicon (LCOS) devices, and/or cathode ray tubes (CRTs).

Multiple projectors may be located remotely from other network components. For example, multiple presentation rooms may each have a networked projector. The projectors may either be fixed installation projectors that are permanently located in a meeting room, or may be removable or portable devices. Since each projector is configured to be linked to network projector operating environment 10, presentations or presentation files contained within the operating environment may be displayed directly from the system by any one of the linked projectors.

Network 20 in projector operating environment 10 may be any suitable computer network, including a local area network (LAN) and/or a wide area network (WAN). The WAN may be a public network, such as the Internet, or a private network. The network may include other types of network devices other than projectors, including printers, scanners, etc. Typically, in the present system, the network allows a user to access presentation files stored remotely on the network without having to bring a computer or storage disk containing the presentation file into the meeting room.

Each projector is linked to the network via a projector computer 22. Projector computer 22, as used herein, includes any internal or external computing device coupled with the projector and the network where the projector computer is able to read and present the presentation files stored on a presentation storage site on the network. Projector device, as used herein, includes the projector and the associated projector computer. It should be noted that multiple projectors may share the same projector computer.

Projector computers 22 may take a variety of different forms. For example, projector computer 22 may be a stand-alone unit, external of the projector, such as a desktop personal computer or a portable personal computer (such as a laptop or personal digital assistant). Alternatively, projector computer 22 may be integrated within projector 12, as schematically illustrated at 26. For example, projector computer 22 may be an embedded card contained within the projector. Such projector computers may be linked to network 20 and projector 22 via any type of wired or wireless communication links, including serial cables, universal serial bus (USB) cables, and/or other wired or wireless links.

In some embodiments, projector computer 22 may be a thin client device., In these embodiments, projector computer 22 serves as a "thin client" or a terminal for presentation manager 18. In such embodiments, projector computer 22 may not need a large amount of storage space for the application software or presentation files, but instead may access the files through network 20 and presentation manager 18. Known applications may be used to provide such a thin client operating environment, including Windows NT 4.0 and Windows 2000 Terminal Server.

In some embodiments, more than one projector may be linked to a single projector computer, as shown at 28. Typically, projector computer 22 is able to run an operating system with a graphical user interface, such as Microsoft's WINDOWS 98, WINDOWS 2000, and/or WINDOWS CE platforms.

A user client computer 14 also may be linked to network 20. User client 14 may be a local computer, for example the client may be on the same LAN as projectors 12. Alternatively, user client 14 may be linked via the Internet or other WAN to projectors 12. A user from any user client 14 may create and store a presentation file on a presentation storage site 29 on the network. Presentation manager 18 (described in more detail below) typically controls such a presentation storage site. The user may then access the presentation files stored on presentation storage site 29 from a projector computer. In this manner, a user may send a presentation file from their networked computer to a user-selected projector 12. Thus, a network user does not need to physically tote or link a laptop computer to the projector in a meeting room to present content created and/or stored at a remote location. In some embodiments, the user may present a presentation in a meeting room from a remote location outside the meeting room.

An administrator client 16 may also be linked to network 20, and thus to projector computer 22 and projector 12. Administrator client 16 may include administrative interface software, also referred to herein as administrative software, that provides network administrators tools to manage projection system 10. For example, the software may provide an administrator interface, including a plurality of dialog boxes which request information as to management of the network projector system or which provide information regarding the settings of the network projection system.

In some embodiments, the software may be configured to permit network administrators to manage projectors in the same manner that they manage other network devices. For example, administrative client 16 may include a Microsoft Management Console (MMC) Snap-In to provide a network interface that integrates with other network administration tools familiar to network administrators. The use of the MMC Snap-In enables integrated administration of additional network components within the network projection system. The MMC Snap-In is a Windows-based Multi-Document Interface (MDI) that imitates interfaces such as Microsoft Explorer and enables the compatibility of the system with other Microsoft and third party network products. One exemplary system for administering projectors is illustrated and described in U.S. patent application Ser. No. 10/194,334 filed on Jul. 11, 2002 of Steve Murtha, De Tran, James D. Wenban, Alan Cossitt, and Joe Castaldi entitled PROJECTOR DEVICE MANAGEMENT SYSTEM, the disclosure of which is hereby incorporated by reference.

The administrative software may enable an administrator to regulate the use of the network projector system. For example, an administrator may apply size limitations on presentation files contained within the network projector system. Additionally, the administrative software may allow an administrator to set automatic deletion dates for presentations files stored within the network projector system. The administrator software may apply such restrictions globally to all users of the network projector system, to administrator-defined groups, such as NT User groups, or to individuals. Furthermore, the administrator software may allow an administrator to allocate network resources depending on an individual or group's use, a specific projector's use, etc. For example, the administrator software may enable an administrator to direct where presentations from a selected user are to be stored and how much storage space is to be allocated to each user.

As briefly described above, presentation manager 18 is linked to network 20 and manages access and storage of presentation files. The presentation manager may be implemented by software executable on a server-computing device or on user client computer 14. In some embodiments, presentation manager 18 may be configured to function as a network server or computer capable of running a typical operating system platform with a graphical user interface. For example, presentation manager 18 may run Microsoft's Windows 98, Windows 2000, Windows CE platforms, or a server operating system platform such as Windows NT. Additionally, presentation manager 18 may function as a projector computer 22 and be linked directly to a projector 12.

Presentation manager 18, typically via input from administrative client 16, may be configured to provide centralized administration and control of file access and storage. For example, presentation manager 18 may include a database or other presentation storage site 29 to store files and presentations created by a user. Alternatively, the presentations may be stored at a remote location on the network accessible and controllable by presentation manager 18, such as client computer 14, administrative client computer 16, projector computer 22, or any other suitable network device. In some embodiments, the presentation manager may store presentation files at a projector-specific storage location for display on a specific network projector (or projectors) selectable by a user. If multiple presentation files are stored in the projector-specific storage location for the user-selected network projector (or projectors), the presentation manager may allow the user to select the desired presentation from the list of stored presentations.

Presentation manager 18 further may be configured to allow the establishment and/or enforcement of general and/or user-specific limitations regarding storage and display of presentation files within the system. For example, server 18 may be used to enforce optional disk space quotas and/or enforce file expiration dates in order to assist network administrators in keeping system resource requirements to a minimum.

As mentioned above, presentation manager 18 may save a user-created presentation file on a presentation storage site 29 managed by the presentation manager and accessible by the presentation manager. The presentation storage site 29 may be associated with a user-selected projector. The storage location may be user-specific, projector-specific or a general storage location. It should be noted that the administrative client computer 16 may be configured to allow an administrator to control where presentation files are stored on the system.

Presentation storage site 29 may be any device suitable for storing data. For example, presentation storage site 29 may be dedicated memory capable of storing files, or a mass storage site. The presentation storage site may be located anywhere accessible to the network projector system, and may be projector-specific. For example, presentation storage site 29 may be contained within the presentation manager 18, the administrative client computer 16, the user client computer 14, the projector computer 22 or any other suitable location on network 20. Regardless of storage location, presentation manager 18 manages access to the stored presentation file.

A user wishing to edit or present a presentation stored within presentation storage site 29 may access the presentation from many different locations within network projector operating environment 10. For example, the user may access a stored presentation for editing or display from user client 14, administrative client computer 16, presentation manager 18, or projector computer 22. Furthermore, the user may access, create, and/or edit presentations when off-line and disconnected from the projector system network. Once a user reconnects to the network, the client may be configured to transfer any updates to the presentation file to the presentation storage site 29 to update the presentation file. Such updates may be requested by the user or via an automatic synchronization, which may occur whenever the user connects to network projector operating environment 10.

Presentation manager 18 may be configured to send or queue a presentation file to a user-selected projector device when directed by a user or an administrator. In some embodiments, the user, via the user client computer 16, may send and display a presentation file in a selected meeting room on the selected projector device without being physically present in the meeting room. Thus, a user from their client computer may select a presentation file and save it for display on a specific projector. The presentation manager manages the presentation file, queuing the file to the selected network-projector. The file may be ready to present in the meeting room with little or no selection required by the operator of the projector in the meeting room.

As described above, the presentation manager identifies the appropriate projector computer and queues the presentation to the respective projector computer for display on the selected projector. A user in the meeting room may select a presentation file from a list of queued presentation files for the selected projector. In other embodiments, a user in a meeting room may wish to access a particular presentation stored on the network. The user may send a request for the desired presentation file to the presentation manager 18 from projector computer 22 located in the meeting room. The request may take the form of a presentation name, a uniform resource locator (URL), or any other suitable identifier. Presentation manager accesses the presentation file and provides the file to the selected projector computer. Accordingly, a user is able to show a presentation on projector 12 without having to bring the presentation file into the meeting room.

Figure 2:
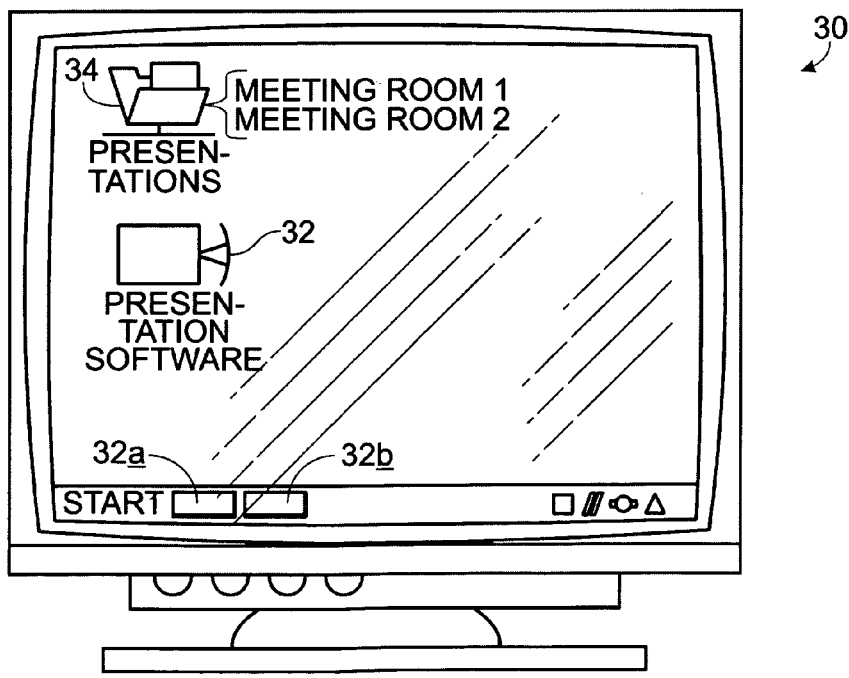
FIG. 2 is a simplified illustration of a user interface according to one embodiment of the present invention.

FIG. 2 shows a graphical user interface on a display screen 30 of a user client computer 16 according to one embodiment of the present invention. By using familiar tools such as windows, icons and pop-up menus, the client computer is provided with an easy-to-use interface. The user interface presentation software provides many of the tools used with other types of files to enhance the user's experience with a projector system, regardless of the type of projectors used in the projector system.

In particular, the client software user interface, also referred to herein as user interface software, provides a method to enable a user to select and access any projector or projector system linked to the network. For example, the client software allows a user to transfer a presentation file to a selected projector or projector system on the network where it may be accessed by the user to display the presentation. Thus, the user from the client computer may select the meeting room and/or projectors onto which the presentation file is to be displayed. The software further provides a method to enable a user to select, and transfer files or presentations located on the network projector system. The user may also be able to define and modify attributes, including, the number of times the presentation file is to be displayed, passwords for the presentation file, deletion dates, etc. related to the presentation file and/or the selected projector.

The user interface software may include dedicated presentation shortcuts that may be used to access the above-described dialogs or similar user interfaces. These shortcuts or icons may be placed on the desktop to provide easy access to the presentation software. For example, a client may be able to open a presentation software icon 32 and/or a network presentation folder icon 34 on display screen 30. For exemplary purposes only, selection of presentation software icon 32 may be configured to open the presentation software described above, enabling a user, amongst other actions, to transfer presentation files, to delete presentation files, password-encrypt presentation files, identify a projector to display a presentation file, etc. Presentation folder icon 34 may be used to automatically save or store a presentation file in a projector-specific or projector-system specific location managed by a respective presentation manager.

Figure 3:
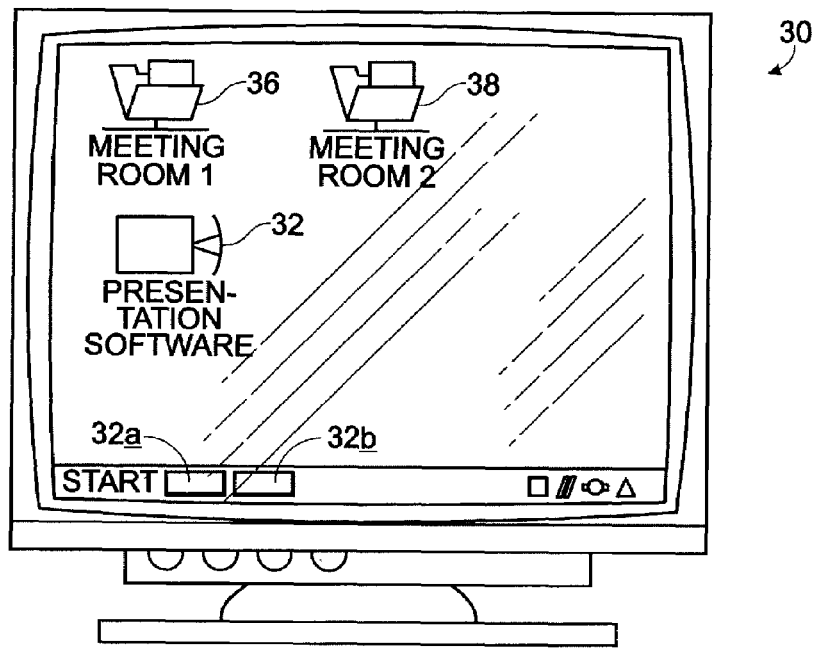
FIG. 3 is another simplified illustration of a user interface according to another embodiment of the present invention.

FIG. 2 illustrates a single network presentation file. However, a user may have multiple presentation files linked to different projector systems available on the network. For example, FIG. 3 illustrates a user interface including multiple network presentation folders, 36 and 38. Each presentation folder may be linked to a different meeting room, projector system, etc.

The presentation icons may have any desired appearance. In the depicted embodiment, the icons have the familiar appearance of other common icons on a windows display. Thus, each icon includes a small picture that is used to represent the network projector system or file and/or presentation database. A user may select an icon on the display screen via a trackball, a mouse, a keyboard or other suitable user-input device. Conventional methods of selection may be used, including double clicking on the icon to open the file. Upon selection, the icon may be converted into a window that displays a dialog box, such as the presentation queue dialog box described above. When either the presentation software or presentation folder is open, a user may also be able to access these features via "buttons" located on a toolbar typically found along the border of the screen, for example buttons 32*a* and 32*b*.

A user also may be able to access the presentation manager and presentation folders, as well as the respective dialog boxes, via a drag-and-drop mechanism. As with typical drag-arid-drop applications, a user in the present system may drag and drop a presentation file to a presentation software icon 32 and/or a presentation folder icon 34, thereby saving the presentation file within the network projection system. Additionally, if a user has access to multiple network projection systems, a user may selectively drop a presentation file onto the appropriate icon dedicated to a specific network projection system.

In some embodiments, the user interface may include a plurality of screens and sub-screens, such as dialog boxes, directed to projection system-specific attributes and/or functions. For example, the dialog boxes may be configured to enable a user to define attributes for the presentation file. Such dialog boxes may include, but are not limited to, a main projection system dialog box, an advanced projection system user dialog box, a presentation queue dialog box, an add/delete presentation dialog box, and a presentation file properties dialog box.

Figure 4:
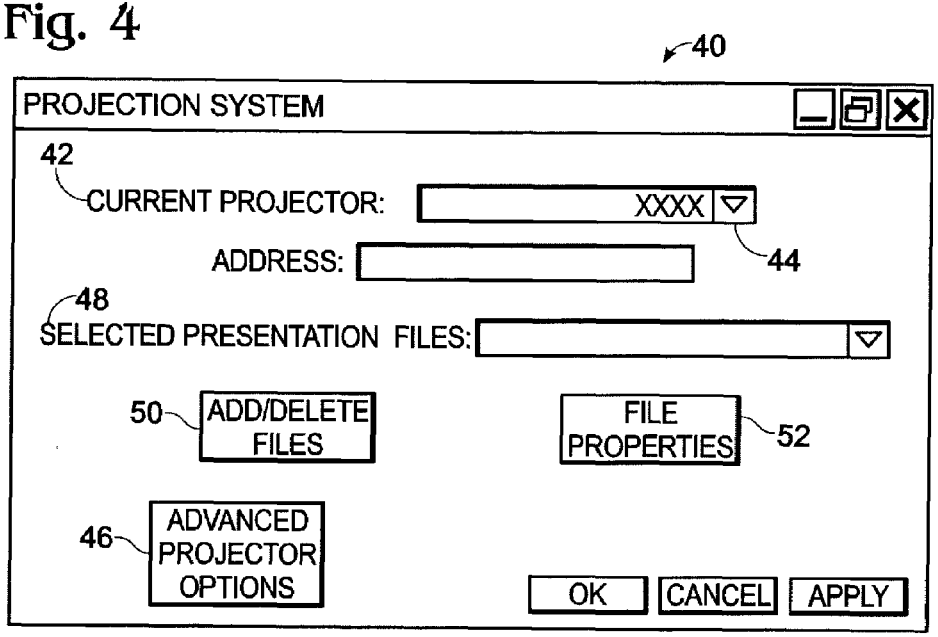
FIG. 4 is a view of an exemplary user interface including a main projection system screen according to an embodiment of the present invention.

The main projection system dialog display, as illustrated in FIG. 4 at 40, may include any suitable information regarding the identity of the current projector system 42, including, but not limited to, the selected network projector and/or meeting room. The projection dialog box may further include a mechanism that allows selection of different projector systems, different projectors or meeting rooms 44, a mechanism for accessing an advanced dialog box that enables a user to change various parameters for the presentation file or the selected projector 46, a list of current selected presentation files for transfer to the projector or meeting room 48, a mechanism for accessing a dialog box to add, delete, or modify selected presentation files 50, and a mechanism of accessing and modifying the properties of various presentation files 52.

Figure 5:
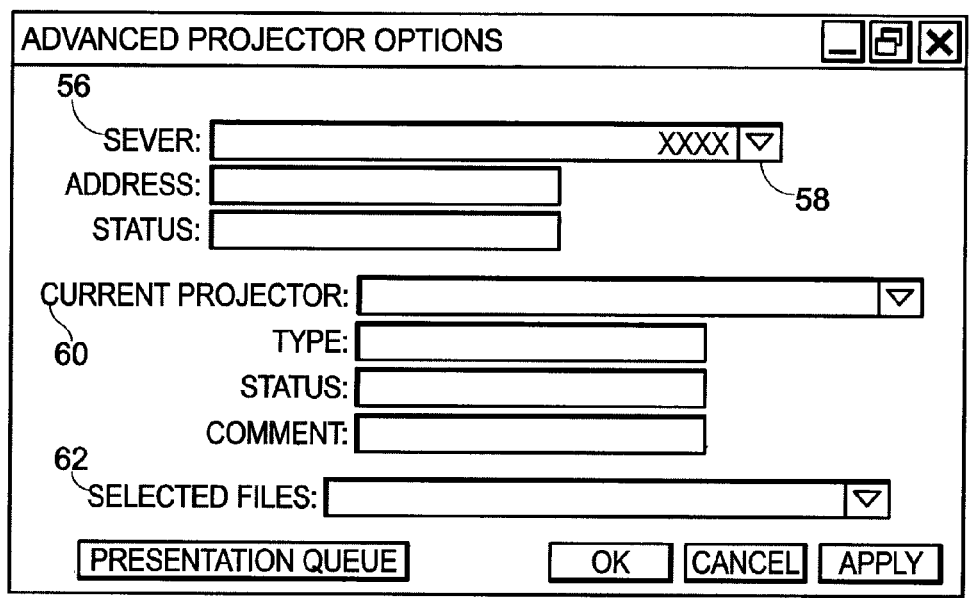
FIG. 5 is a view of an exemplary advanced options sub-screen of the embodiment of FIG. 4.

Other screens may be provided to facilitate selection and storage of a presentation file for display on a network projector. For example, an exemplary advanced projection system dialog display is shown in FIG. 5 at 54. The screen may be configured to display information regarding the current server 56 and a mechanism for changing the current server 58. The advanced dialog display may further include information regarding the current projector 60, as well as information and parameters defined by the administrative client or server for a specific projector system or projector. In some embodiments, the advanced dialog display may include a mechanism for viewing and modifying presentation files queued to a specific projector or projector system on the network 62.

The user interface may further include a queue screen. An exemplary presentation queue dialog box is shown generally at 64 in FIG. 6. The queue dialog box may be accessible via the advanced projection system dialog box 54 and may include a mechanism for displaying presentation files currently queued to a specific projector system, projector or meeting room, as indicated at 66. The box may further include a mechanism to add/delete presentation files from the list 68. Similarly, an add/delete presentation files dialog box may provide a mechanism for modifying, adding and removing presentation files or projectors on a user presentation file directory or list, a presentation file database, a specific projector or meeting room queue, etc.

Figure 7:
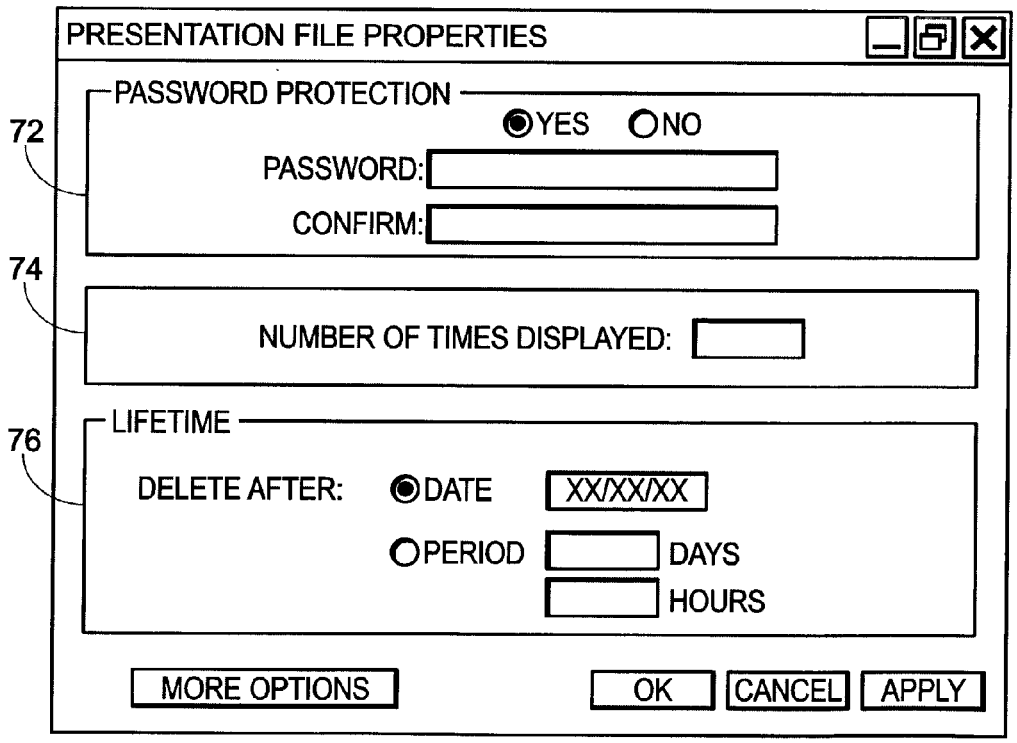
FIG. 7 is a view of another exemplary sub-screen of the embodiment of FIG. 4.

Additionally, in some embodiments, a presentation file properties dialog box, as shown in FIG. 7 at 70, may be provided to enable a user to modify the characteristics of a presentation file slated to be sent to a specific projector or projectors. The controls presented in this dialog box may be a function of the settings on the selected projector, the parameters defined by the administrator, etc. For example, the user may be able to provide password protection for the presentation file, as illustrated at 72. These controls may differ between users and/or selected projectors. Additionally, in some embodiments, the user and/or administrator may select or modify the number of times that the presentation file may be viewed or displayed, as shown at 74. Similarly, in some embodiments, the user may select or modify the 'lifetime' of the presentation file, where at the end of the 'lifetime' the presentation file is automatically deleted, as shown at 76.

As described briefly above, the user interface software may enable a user to set and/or change various attributes for each presentation file. The selectable items or attributes within a presentation file properties dialog box, or like screen, may be based on the projector settings or may be mandated by an administrator or particular network projector system. Selectable attributes may include, but are not limited to, personalized identification codes and names, password protections, viewing limitations, and lifetime settings. Accordingly, a user also may be able to password encrypt the file or provide other security mechanisms to limit access to the presentation. The password may be able to be reset. Additionally, a user may also be able to specify a date or period of time for deletion, and/or a limit on the number of times that a presentation may be accessed prior to automatic deletion. Additionally, a user may be able to indicate that a presentation is read-only or otherwise unalterable unless prior authorization is obtained.

The user interface described above may be configured to allow presentation content within the network projector system to be accessed and stored through the use of standard operating system-provided tools. For example, in the Windows environment, standard plug-ins, such as those for use with Active-X, MMC and Calm may be used to configure the presentation access and storage capabilities. Using utilities such as these, the user client interface may be configured to provide access to the items within each of the dialog boxes through familiar-looking menus. A user, through such a menu, may be able to select whether they want to save, open, edit, select, format, etc. a particular presentation file. Typically, the user may choose an item from the menu by highlighting it and then pressing an enter or return key, or by simply pointing to and selecting the item with a mouse or other user-input device. The user also may be able to access the presentation software menu by a "send to menu" function. For example, presentation files may be selected and sent to a presentation folder via the right-click "Send-To" menu from the Microsoft Explorer program. Particular menu options may be linked with respective dialog boxes, as discussed above.

The user interface software may also include a client presentation wizard that aids the user in operating the presentation software. The client presentation wizard may lead the user through a plurality of simplified steps, including generating, storing, and accessing presentation software and presentation files. Typically, the client presentation wizard will include an introductory screen, step screens, and a finish summary screen. Each screen may include a help button, a cancel button, a next button, and a finish button.

For example, a client presentation wizard may be used to help create a desktop shortcut to a network projector system, a presentation database, a meeting room, etc. Similarly, the client presentation wizard may help a user create a "Send to" shortcut to a specific projector on the currently selected server. The client presentation wizard may enable a user to personalize the network projector shortcut. For example, the user may select a name for the shortcut other than the default name assigned to the projector by an administrator.

In one embodiment of the present invention, the user creates a presentation shortcut to a selected projector on the user client desktop using the client presentation wizard. The user then drops a presentation file onto the presentation shortcut. The presentation manager manages the presentation file in accordance to the user-selected attributes, stores or locates the presentation file, and queues the presentation file for display on the selected projector. The user may then present the presentation file at the projector by selecting the appropriate presentation file from the queued list managed by the presentation manager. The user may select the desired presentation file using the projector computer linked to the projector.

Each of the above tools provides an easy-to-use interface with an appearance that is familiar to many computer users. This familiarity with dialog boxes, pull-down menus, shortcuts and wizards may help to simplify the use of network projector systems. It will be appreciated that such software, incorporating the same types of dialog boxes, pull-down menus, shortcuts and wizards may also be implemented on the administrator client 16, and on the projector computer 22.

FIG. 8 further illustrates a method 78 according to an embodiment of the present invention for managing display of a presentation file on a networked computer system including a user computer and a projector device. The method includes receiving a presentation file from a user computer directed to a user-selected projector device on a network, where the user-selected projector device includes a projector and a projector computer, as shown at 80. The method further includes managing storage of the presentation file, at 82, such that the presentation file is stored in a presentation storage site on the network associated with the user-selected projector device, at 84, and queuing the presentation file to the selected projector device for display on the projector device, as indicated at 86.

While various alternative embodiments and arrangements for a network projector interface system have been shown and described above, it will be appreciated by those skilled in the art that numerous other embodiments, arrangements and modifications are possible and are within the scope of the invention. Thus, although the present invention has been disclosed in specific embodiments thereof, the specific embodiments are not to be considered in a limiting sense, because numerous variations are possible. The subject matter of the invention includes all novel and nonobvious combinations and subcombinations of the various elements, features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of features, functions, elements, and/or properties may be claimed through amendment of the present claims or through presentation of new claims in this or a related application. Such claims, whether broader, narrower, equal, or different in scope to the original claims, also are regarded as included within the subject matter of the invention of the present disclosure.

We claim:

1. A network projector interface system comprising:

client software stored on a recordable medium and at least partially executable on a client computer on a network, where the client software provides a graphical-user client interface configured for video display and to aid a user in directing a presentation file to a selected one of available network projectors, the graphical-user client interface including at least one dedicated presentation icon onto which a user may drop a presentation file to direct the file to the selected network projector;

wherein the graphical-user client interface includes a plurality of presentation-specific dialog boxes for directing the presentation file to the selected network projector;

wherein one of the dialog boxes enables a user to select attributes for the presentation file;

wherein the attributes include identification of a presentation deletion date, creation of a password to allow access to the presentation file, and identification of the number of times the presentation file may be displayed;

presentation manager software stored on a recordable medium executable on the network, where the presentation manager software provides a presentation manager configured to communicate with the client software and to manage storage of and access to the presentation file; and a network projector coupled to a projector computer, where the projector computer is coupled to the network and communicates with the presentation manager to display the presentation file on the selected network projector, and wherein the projector computer is remotely located relative to the client computer.

2. The system of claim 1, further comprising administrative software executable on the network configured to enable an administrator to regulate the use of the network projector.

3. The system of claim 2, where the administrator software is executable to present at least one selectable parameter for the presentation file based on a characteristic of the selected network projector.

4. The system of claim 2, where the administrator software is executable to present at least one selectable parameter for the presentation file based on identity of the user.

5. A network projector interface system comprising:

client software stored on a recordable medium and at least partially executable on a client computer on a network, where the client software provides a graphical-user client interface configured for video display and to aid a user in directing a presentation file to a selected one of available network projectors, wherein the graphical-user client interface includes a plurality of presentation-specific dialog boxes for directing the presentation file to the selected network projector and at least one of the dialog boxes enables a user to set a presentation deletion date or to create a password to allow access to the presentation file or to set a number of times the presentation file may be displayed and at least one of the dialog boxes enables a user to set a presentation deletion date and to create a password to allow access to the presentation file and to set a number of times the presentation file may be displayed;

presentation manager software stored on a recordable medium executable on the network, where the presentation manager software provides a presentation manager configured to communicate with the client software and to manage storage of and access to the presentation file; and a network projector coupled to a projector computer, where the projector computer is coupled to the network and communicates with the presentation manager to display the presentation file on the selected network projector, and wherein the projector computer is remotely located relative to the client computer.

6. The system of claim 1, where the dedicated presentation icon is a desktop icon.

7. The system of claim 1, where the dedicated presentation icon is one of a plurality of dedicated presentation icons, each dedicated presentation icon corresponding to a different network projector, and where the particular network projector to which a presentation file is directed is selected by dropping the presentation file on the dedicated icon corresponding to that network projector.

* * * * *